United States Patent
Hingoranee

(10) Patent No.: US 7,278,028 B1
(45) Date of Patent: Oct. 2, 2007

(54) SYSTEMS AND METHODS FOR CROSS-HATCHING BIOMETRICS WITH OTHER IDENTIFYING DATA

(75) Inventor: Rajesh R. Hingoranee, Plano, TX (US)

(73) Assignee: Evercom Systems, Inc., Dallas, TX (US)

( * ) Notice: Subject to any disclaimer, the term of this patent is extended or adjusted under 35 U.S.C. 154(b) by 698 days.

(21) Appl. No.: 10/701,549

(22) Filed: Nov. 5, 2003

(51) Int. Cl.
*G06F 1/24* (2006.01)

(52) U.S. Cl. .............. 713/186; 713/193; 713/161; 713/182

(58) Field of Classification Search ............. 713/186, 713/193, 161, 182
See application file for complete search history.

(56) References Cited

U.S. PATENT DOCUMENTS

| | | | | |
|---|---|---|---|---|
| 3,790,700 A | * | 2/1974 | Callais et al. | 725/114 |
| 3,798,359 A | * | 3/1974 | Feistel | 380/37 |
| 3,798,605 A | * | 3/1974 | Feistel | 713/155 |
| 3,806,874 A | * | 4/1974 | Ehrat | 713/185 |

OTHER PUBLICATIONS

U.S. Appl. No.10/135,878, Viola et al.
U.S. Appl. No. 10/217,149, Mudd et al.
U.S. Appl. No. 10/306,248, Falcone et al.
U.S. Appl. No. 10/602,233, Sullivan et al.
U.S. Appl. No. 10/640,505, Falcone et al.
U.S. Appl. No. 10/360,442, Falcone et al.

\* cited by examiner

*Primary Examiner*—Thomas Peeso
(74) *Attorney, Agent, or Firm*—Fulbright & Jaworski LLP

(57) ABSTRACT

In accordance with embodiments of the present invention a present authentication or identification process includes iterative and successive cross-hatching of biometric components such as voice print, fingerprint, hand analysis, retina scan, iris scan, and/or features (such as facial characteristics, scars, tattoos and/or birthmarks) with other identifying data such as a PIN, password phrase, barcode, or identification card.

62 Claims, 2 Drawing Sheets

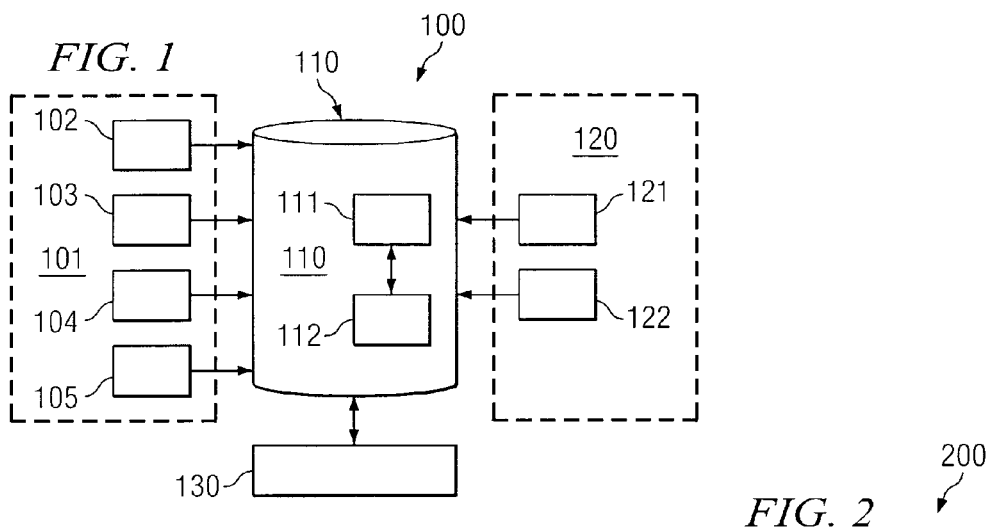
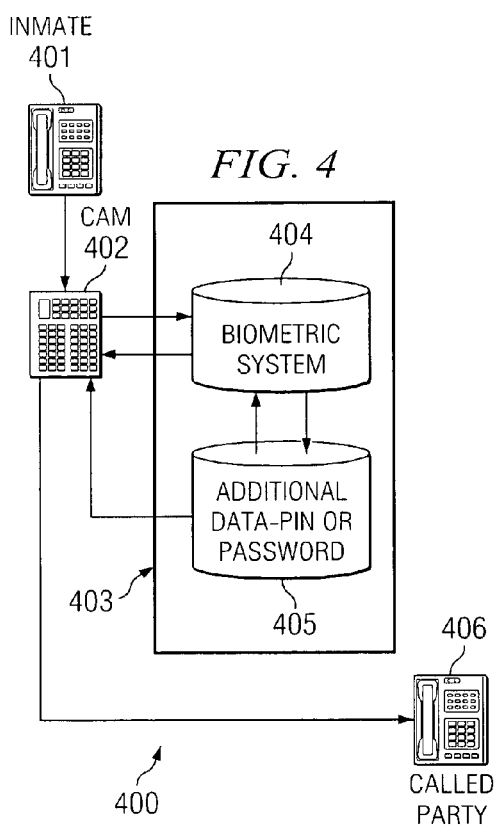
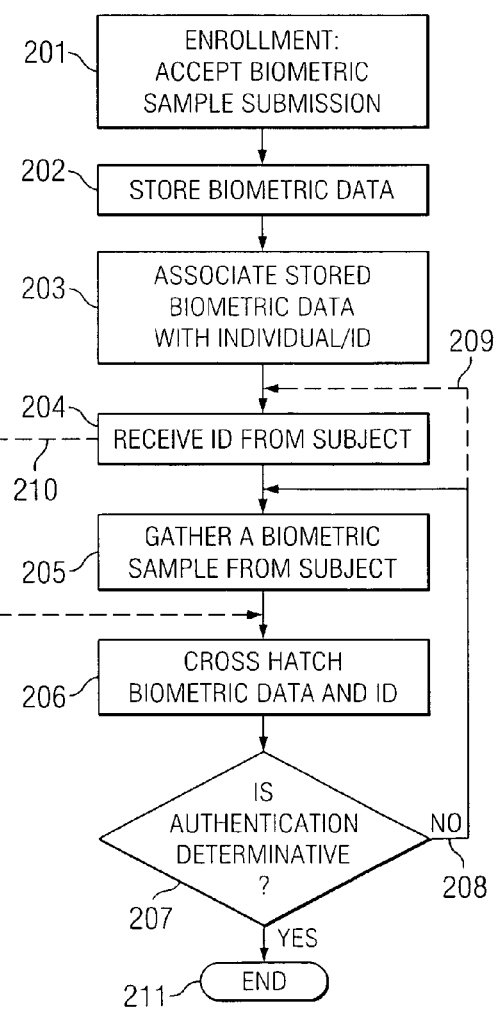

FIG. 3

| FUNCTION | CROSS-HATCHING PERMUTATIONS |
|---|---|
| BOOKING — 301 | VOICE PRINT + PIN + CHALLENGE PHRASE — 302<br>VOICE PRINT + FINGERPRINT + PIN + CHALLENGE PHRASE — 303<br>VOICE PRINT + FEATURE SCAN + IRIS SCAN + PIN + CHALLENGE PHRASE — 304<br>VOICE PRINT + IRIS SCAN + PIN + CHALLENGE PHRASE — 305<br>VOICE PRINT + FEATURE SCAN + PIN + CHALLENGE PHRASE — 306 |
| COMMUNICATIONS — 307 | VOICE PRINT + PIN + CHALLENGE PHRASE — 308<br>VOICE PRINT + FINGERPRINT + PIN + CHALLENGE PHRASE — 309 |
| TRANSACTIONS — 310 | VOICE PRINT + PIN + CHALLENGE PHRASE — 311<br>VOICE PRINT + FINGERPRINT + PIN + CHALLENGE PHRASE — 312 |
| EVENTS — 315 | VOICE PRINT + PIN + CHALLENGE PHRASE — 316<br>VOICE PRINT + HAND ANALYSIS + PIN + CHALLENGE PHRASE — 317<br>VOICE PRINT + IRIS SCAN + PIN + CHALLENGE PHRASE — 318 |
| VISITATION — 320 | VOICE PRINT + CHALLENGE PHRASE — 321<br>VOICE PRINT + FINGERPRINT + CHALLENGE PHRASE — 322<br>VOICE PRINT + HAND ANALYSIS + CHALLENGE PHRASE — 323<br>VOICE PRINT + FINGERPRINT + IRIS SCAN + CHALLENGE PHRASE — 324 |
| RELEASE — 325 | VOICE PRINT + PIN + CHALLENGE PHRASE — 326<br>VOICE PRINT + FINGERPRINT + PIN + CHALLENGE PHRASE — 327<br>VOICE PRINT + FEATURE SCAN + IRIS SCAN + PIN + CHALLENGE PHRASE — 328<br>VOICE PRINT + IRIS SCAN + PIN + CHALLENGE PHRASE — 329<br>VOICE PRINT + FEAUTRE SCAN + PIN + CHALLENGE PHRASE — 330 |
| INFORMATION SHARING — 331 | VOICE PRINT + PIN + CHALLENGE PHRASE — 332<br>VOICE PRINT + FINGERPRINT + PIN + CHALLENGE PHRASE — 333 |
| TRACK AND IDENTIFY — 335 | VOICE PRINT + PIN + CHALLENGE PHRASE — 336<br>VOICE PRINT + FINGERPRINT + PIN + CHALLENGE PHRASE — 337<br>VOICE PRINT + ANI + CHALLENGE PHRASE — 338<br>FINGERPRINT + FEATURE SCAN + CHALLENGE PHRASE — 339 |
| PAROLEE TRACKING — 340 | VOICE PRINT + FINGERPRINT + CHALLENGE PHRASE — 341<br>IRIS SCAN + HAND ANALYSIS + CHALLENGE PHRASE — 342<br>VOICE PRINT + FINGERPRINT + ANI + TIME + CHALLENGE PHRASE — 343 |
| SUSPECT IDENTIFICATION-REVERSE LOOKUP — 345 | VOICE PRINT + FINGERPRINT + CHALLENGE PHRASE — 346 |
| PUBLIC BUILDINGS — 350 | FINGERPRINT + IRIS SCAN + CHALLENGE PHRASE — 351<br>IRIS SCAN + RETINAL SCAN + CHALLENGE PHRASE — 352<br>HAND ANALYSIS + IRIS SCAN + CHALLENGE PHRASE — 353 |

SYSTEMS AND METHODS FOR CROSS-HATCHING BIOMETRICS WITH OTHER IDENTIFYING DATA

RELATED APPLICATIONS

This application is related to commonly assigned and co-pending U.S. patent application Ser. Nos. 10/135,878 entitled "INFORMATION MANAGEMENT AND MOVEMENT SYSTEM AND METHOD", filed Apr. 29, 2002; Ser. No. 10/217,149 entitled "SYSTEM AND METHOD FOR CALL TREATMENT", filed Aug. 12, 2002; Ser. No. 10/360,248 entitled "SYSTEM AND METHOD FOR ACCOUNT ESTABLISHMENT AND TRANSACTION MANAGEMENT USING INTERRUPT MESSAGING", filed Feb. 7, 2003; Ser. No. 10/360,442 entitled "SYSTEMS AND METHODS FOR TRANSACTION AUTHORIZATION DETERMINATION", filed Feb. 7, 2003; Ser. No. 10/602,233 entitled "SYSTEMS AND METHODS FOR TRANSACTION AND INFORMATION MANAGEMENT", filed Jun. 24, 2003; and Ser. No. 10/640,505 entitled "SYSTEM AND METHOD FOR CALLED PARTY CONTROLLED MESSAGE DELIVERY", filed Aug. 13, 2003; the disclosures of which are incorporated herein by reference.

TECHNICAL FIELD

The present invention is broadly related to systems and methods for identification and/or verification, and specifically related to systems and methods for cross-hatching biometrics with other identifying data to perform identification and/or verification.

BACKGROUND OF THE INVENTION

"Biometrics" is a term of art that refers to automated methods for identifying people or verifying a person's identity based on their unique physiological characteristics or behavioral traits. Various types of biometric identification or verification methods include fingerprint scanning, iris scanning, retina scanning, facial characteristics analysis, handwriting analysis, handprint recognition and voice scanning or voice print analysis. The word "biometrics" may also be used to refer to the field relating to biometric identification. The use of "biometric" as an adjective pertains to technologies that utilize behavioral or physiological characteristics to determine or verify identity. "Biometric sample" may refer to an identifiable, unprocessed image or recording of a physiological or behavioral characteristic, acquired during submission, used to generate biometric templates. As used herein a "template" is a mathematical representation of a biometric sample. Templates can vary in size, for example from 9 bytes for hand geometry to several thousand bytes for a facial recognition file. The phrase "biometric data" as used herein, refers to a processed sample in a form that is capable of being stored electronically or similarly archived as a template. A "biometric system" as used herein is integrated biometric hardware and software used to conduct biometric identification or verification. "Enrollment" as used herein is the initial process of collecting one or more biometric samples from a subject and storing the resulting biometric data as a template for later comparison. "Feature extraction" is an automated process of locating and encoding distinctive characteristics from a biometric sample in order to generate a template.

In the biometric arts "authentication", generally speaking is a process for establishing the validity of a user attempting to gain access to something such as a system, service or location. The terms "identification" and "recognition" are synonymous in the biometric arts. In both processes, a sample is presented to a biometric system during enrollment. The system then attempts to find out who the sample belongs to, by comparing the sample with a database of samples in an attempt to find a match. This is also known as a one-to-many (1:n) comparison. In contrast, "verification" is a one-to-one comparison in which the biometric system attempts to verify an individual's identity. Verification (1:1 matching) is the process of establishing the validity of a claimed identity by comparing a verification template to an enrollment template. Verification typically requires that an identity be claimed by a subject, after which an enrollment template of the subject is located and compared with a verification template derived from a sample provided by the subject. If the two samples match, the biometric system confirms that the subject is who he or she claims to be. Typically the subject of verification is using a facility or service of a company, institution or the like. Some verification systems perform very limited searches against multiple enrollee records. For example, a user with three enrolled finger-scan templates may be able to use any one of the three fingers to verify his identity. One-to-few (1:few) matching is a middle ground between identification and verification. This type of authentication involves identification of a user from a very small database of enrollees. While there is no exact number that differentiates a 1:n from a 1:few system, any system involving a search of more than 500 records is likely to be classified as 1:n. A typical use of a 1:few system may be to control access to sensitive rooms at a 50-employee company or the like, where users place their finger on a device and are identified from a small database. Thus, identification and recognition involve matching a sample against a database of many, whereas verification involves matching a sample against a database of one. A key distinction between these two approaches centers on the questions asked by the biometric system and how this fits within a given application. During identification, the biometric system asks, "Who is this?" and establishes whether a biometric record exists, and, if so, provides the identity of the enrollee whose sample was matched. During verification, the biometric system asks, "Is this person he or she claims to be?" and attempts to verify the identity of a subject. Herein, the word "authentication" will be used broadly to generally encompass identification, recognition and verification.

The biometrics industry is growing relatively slowly. One factor contributing to this slow growth is convenience of use due to availability of equipment and related systems. For example, in law enforcement hardware needs to be stable and durable, however biometric equipment with such stability and durability is not widely available. Nevertheless, utilizing biometrics for personal authentication is convenient for end users and considerably more accurate than previously used methods such as the utilization of passwords or Personal Identification Numbers (PINs). The use of biometrics is convenient for the end user as there is nothing for the subject to carry or remember. The aforementioned accuracy is due in large part to biometrics linking an event to a particular individual, whereas a password or token may be used by someone other than the authorized user. Biometric authentication is based on an identification of an intrinsic part of a human being. Tokens, such as smart cards, magnetic stripe cards, physical keys, and so forth, can be lost, stolen, or duplicated. Passwords can be forgotten, shared, or observed. Furthermore, electronic biometric techniques can provide an audit trail. Biometrics are becoming widely accepted, familiar and inexpensive. Currently, fingerprint and voice authentication are popular biometrics. Voice printing is commonly used in conjunction with a PIN or similar identification number, although accuracy is always questionable depending on how and where this biometric is used.

Typically, a good biometric system is low cost, fast, accurate and easy to use. There are certain common characteristics that make Biometric systems for identification and/or authorization more acceptable. Typically, the biometric must be based upon a distinguishable trait. For example, for nearly a century, law enforcement has used fingerprints to identify people. There is a great deal of scientific data supporting the concept that no two fingerprints are alike. However, newer methods, even those with a great deal of scientific support, such as DNA-based genetic matching, are typically more slowly adopted or accepted. Individuals may find biometric authentication relatively acceptable in that most people find it acceptable to have their pictures taken by video cameras or to speak into a microphone. Typically, at least in the United States, using a fingerprint sensor does not seem to be objectionable to most people.

Cost considerations for a biometric identification or verification system not only include the initial cost of the sensor and matching software that is involved in a biometric Solution, but often, life-cycle support cost of providing system administration support. Additional biometric identification and verification system operation costs may include employment of an enrollment operator or similar personnel. Thus, operation costs for a biometric identification and verification system can quickly overtake the initial cost of the hardware and software.

Terms of art that are used to describe the accuracy of biometric systems include false-acceptance rate, false-rejection rate, and crossover-error or equal-error rate. False-acceptance rate (FAR) may be viewed as the percentage of imposters incorrectly matched to a valid user's biometric. False-rejection rate (FRR) may be viewed as the percentage of incorrectly rejected valid users. The crossover error rate (CER) is the error rate at which FAR equals FRR and is used as a comparison metric for different biometric devices and technologies. The lower the CER, the more accurate and reliable the biometric device. In biometrics, it is typically beneficial to consider the crossover-error rate (or at least the false-acceptance rate) and the false-rejection rate together. For many biometrics systems, an acceptance threshold can be set, typically by a biometric system administrator, to establish the degree of correlation necessary for a comparison to be deemed a match. This threshold may be set to ensure that virtually no impostors will be accepted. Problematically, such a restrictive threshold results in at high false-rejection rate, and thus an unreasonably high number of authorized users will be rejected. Using biometrics in any industry there is always the possibility of a false positive, depending on how it is used. For example, an iris scan might be affected by an eye condition or an individual may not have a particular finger or hand required for a fingerprint scan or a hand scan. Such false positive are unacceptable in many circumstances, including many circumstances occurring in an incarceration or law enforcement environment which might result in detention or release of the wrong individual.

Biometric technologies are becoming a foundation of an extensive array of highly secure identification and personal verification solutions and are coming into use not only in private industry, but also by federal, state, and local governments, including law enforcement agencies. Law enforcement has already widely adopted fingerprinting and fingerprint scanning. However, there is an increasing need for automated authentication technologies in the law enforcement community, particularly solutions well suited for use in law enforcement and incarceration environments. Such systems need to provide certainty of identification in certain circumstances while convenience of use is a primary concern in other circumstances.

BRIEF SUMMARY OF THE INVENTION

The present invention is directed to systems and methods for identification methodologies using an iterative, cross-hatching process of biometrics and other identification mechanisms. Preferably, embodiments of the present systems and methods include automated methods of statistical analysis in which algorithms assess biometrics, such as fingerprints, iris, retina, handprint, and voice. The present systems and methods deal with dependability such as the aforementioned dependability problems associated with voiceprint and PIN combinations.

"Cross-hatching," as used herein is a term that refers to adding one type of data to another type of data. An iterative process is characterized by repetition, as used herein the word "iterative" is used to characterize a process which is repeated to add data. The present systems and methods successively repeat the process of verifying an individual by adding a biometric or other identifying data. In this manner the present systems and methods are iterative in that they repeat cross-hatching and successive in that the present systems successively add data to the cross-hatched. Embodiments of the present invention uses successive biometric components cross-hatched with user provided identification components, which may also or alternatively be successively obtained, allowing the present systems and methods to increase the probability of accurate verification or identification of a person. In accordance with embodiments of the present systems and methods a fingerprint, by way of example, may be initially used to identify or validate the identity of a subject, particularly in conjunction with any identifying data such as an account number or identification number provided by the subject. Iteratively, a hand analysis or a voice print analysis may be further employed to increase the probability of an accurate match or non-match. In this manner, the present systems and methods employ biometric components such as voice prints, fingerprints, hand prints, retina, iris or features such as facial characteristics, scars, tattoos, birthmarks and/or the like, cross-hatched with other pertinent data such as personal identification numbers, passwords, etc., and matched against previously recorded templates to provide identification or verification.

The present systems and methods may take advantage of the accuracy provided by biometrics compared to a traditional identifying data such as security card scanners or the like, as biometrics increase the probability of identifying the proper individual. As noted above errors in identification can pose a problem if there is a false identification, a false positive. The present invention addresses this problem by employing a successive iterative cross-hatching process that allows a user to employ several biometric components that lead to a high probability of correctly identifying an individual, or verifying the identity of an individual, as the case may require. For example, in identification a biometrics system identifies, who is gaining access to a program or gaining entry to a door, whereas in verification a person desiring to gain access to a secure door is first identified, typically by the person themselves through the use of a token. Once the person has identified himself or herself, the system verifies whether the person is who they present themselves to be.

An embodiment of an authentication method in accordance with the present invention includes iterative and successive cross-hatching of at least one of a plurality of biometric components with at least one of a plurality of other identifying data. This authentication may be made for purposes of identification of an individual, verification of an individual's identity, or for similar purposes. The biometric components involved may include a voice print, a fingerprint, a hand analysis, a retina scan, an iris scan, features, or the like. The other identifying data used may include an account number a personal identification number, a password, a challenge phrase, a barcode such as may be disposed on an bracelet or card, or the other similar identifying data. The other identifying data may be incorporated into a swipe card, radio frequency card, smart card, or the like.

An embodiment of a security authentication method may include accepting a submission of a plurality of different types of biometric samples from a subject and storing data based on the biometric samples in a database as related to the subject and related to identifying data associated with the subject. During a subsequent authentication, identifying data is received from an individual who is to be authenticated and biometric data is gathered from the individual who is to be authenticated. The received identifying data and the gathered biometric data are cross-hatched against the data stored in the database to authenticate the individual. If the cross-hatching fails to authenticate the individual, additional biometric data from the individual is preferably gathered from the individual in a successive manner. Then cross-hatching of the successive biometric data is preferably interatively repeated until a determinative authentication status of the individual, positive or negative, can be reached. Alternatively, upon failure of the initial cross-hatching, additional identifying data may be successively gathered from the individual. Then cross-hatching of the successive identifying data is preferably interatively repeated until a determinative authentication status of the individual, positive or negative, can be reached. The type of identifying data received and the type of biometric data gathered may vary based on a location in a facility in which the invention is practiced or based on a function the individual wishes to carry out An embodiment of and authentication system in accordance with the present invention has means for accepting submission of biometric samples of a plurality of different types from a subject, and a database storing data based on the biometric samples as being related to the subject and being related to identifying data associated with the subject. To authenticate an individual this embodiment of a system has means for receiving identifying data provided by an individual who is to be authenticated and means for gathering biometric data of at least one of the types from the individual. Preferably, an algorithm cross-hatches the received identifying data and the gathered biometric data against the data stored in the database to authenticate the individual. In response to the cross-hatching failing, the algorithm may direct the means for gathering biometric data to gather successive biometric data from the individual and the algorithm interatively repeats the cross-hatching incorporating the successive biometric data, until a determinative authentication status of the individual, positive or negative, can be reached. Alternatively, the algorithm may direct the means for receiving identifying data to query the individual for successive identifying data in response to the cross-hatching failing and the algorithm interatively repeats the cross-hatching incorporating the successive identifying data, until a determinative authentication status of the individual, positive or negative, can be reached.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 1 is a diagrammatic illustration of an embodiment of the present systems;

FIG. 2 is a flow chart of operation of an embodiment of the present methods;

FIG. 3 is a table showing various examples of combinations of biometrics and other identifying data used by embodiments of the present invention in different situations in an incarceration or law enforcement environment; and FIG. 4 is a diagrammatic illustration of an example of authentication used for placement of a phone call by a detainee in accordance with an embodiment of the present invention.

DETAILED DESCRIPTION

FIG. 1 is a broad diagrammatic illustration of system 100 adapted for the use of cross-hatching of biometric components iteratively with other data as a basis for authentication. In one embodiment the cross-hatching employed may depend on the location where authentication will allow access and/or the function that is being authenticated. System 100 preferably has at least one device 101 that may be capable of accepting submission of biometric samples of a plurality of different types from a subject. Alternatively, a plurality of different devices capable of accepting submission of one or more types of biometric samples from a subject may be employed by system 100. Such devices might include fingerprint scanner 102, hand scanner 103, communications device 104 for taking a voice sample, camera 105 for scanning features, an eye scanner for taking a retina and/or iris scan, or other similar devices. Features scanned by camera 105 may include facial characteristics, scars, tattoos, birthmarks and/or the like. Voice print and fingerprint are a combination of biometrics which can be obtained in accordance with the present invention through telephones equipped with an associated fingerprint scanner.

Database 110 preferably stores biometric data 111 and data relating stored biometric samples to subjects and identifying data 112 associated with the subject. The system may also employ mechanism 120 for receiving identifying data provided by an individual who is to be authenticated such as key pad 121 to receive a PIN, account number or other identifying number, or card reader 122 to read a card in the possession of the person to be authenticated. Algorithm 130 may be employed by the present systems and methods to ascertain whether a sample and a template are a match. Preferably, algorithm 130 preferably cross-hatches received identifying data and gathered biometric data against said data stored in the database to authenticate an individual. In response to the initial cross-hatching failing, the algorithm preferably queries the individual for a successive biometric sample of another type and/or successive identifying data. Algorithm 130 interatively repeats cross-hatching, incorporating the successive biometric data or identifying data, until a determinative authentication status of the individual, positive or negative, can be reached.

"Matching" as used herein is comparison of biometric templates to determine their degree of similarity or correlation. In accordance with the present invention a match attempt may result in a score that may be compared against a threshold. If the score exceeds the threshold, the result may be considered a match; if the score falls below the threshold, the result is a non-match. A "score" may be a number indicating the degree of similarity or correlation of a biometric match. This score may represent the degree of correlation between an authentication template and a stored enrollment template. The scale used for biometric scoring may take any of a number of forms such as a 1-to-100 scale, a scale of −1 to +1 and/or a logarithmic scale. Traditional authentication methods, such as passwords, PINs, keys, and tokens are typically binary in nature, offering only a strict yes/no response. This is not the case with the present biometric systems and methods which may employ a matching algorithm that generates a score subsequent to a match attempt.

Voice print is a biometric component well suited for use in conjunction with a non-biometric challenge phrase, such as providing the subject's mother's maiden name or a password. Specifically, the speaking of a challenge phase by a subject can render a voice print sample. Such a request for a challenge phrase, or a similar request that a subject speak a phrase to provide a voice print sample, can be carried out over a phone, including a wireless phone, in accordance with the present systems and methods.

However, in accordance with embodiments of the present invention voice print can be used from authentication without prior enrollment. For example, a subject may perform continuous speech as in a normal phone call and a resulting voice print sample may be gathered. Differences in the way these phonemes are put together to form words can be attributed to an individual. Thus, the differences in the way the speaker enunciates the phonemes of speech may be used to provide a type of "voice print" biometric for cross-hatching in accordance with the present invention to carry out authentication. This type of voice printing may be particularly useful when identifying the speaker.

FIG. 2 is a flow chart of an embodiment for authentication method 200 in accordance with the present invention. Method 200 employs iterative and successive cross-hatching of at least one of a plurality of biometric components with at least one of a plurality of other identifying data. At 201 submission of a plurality of different types of biometric samples are accepted from a subject. Data based on these biometric samples is stored in a database at 202 and related to the subject and/or to identifying data associated with the subject at 203. As noted above the types of biometric samples and data may include a voice print, a fingerprint, a hand analysis, a retina scan, an iris scan, a feature scan, or the like. Identifying data from an individual who is to be authenticated is received at 204. Also as noted above, identifying data may include an account number, a personal identification number, a password, a challenge phrase, a barcode, data incorporated into a card, or the like. Information such as a PIN, account number or other identifying number may be received via a keypad. A card reader may be used to read a card in the possession of the person to be authenticated to obtain identification information. Biometric data is gathered from the individual who is to be authenticated at 205. The type of identifying data received and requested and the type of biometric data gathered may vary based on location in a facility or a function the individual wishes to carry out. The received identifying data and the gathered biometric data are cross-hatched at 206 against the data stored in the database to authenticate the individual. At 207 a determination is made as to whether the cross-hatching failed to authenticate the individual. If the cross-hatching failed to authenticate the individual, additional successively biometric data is gathered (208) or identification data is gathered (209) from the individual and cross-hatching at 206 is interatively repeated, incorporating the successive biometric or identification data (210) until a determinative authentication status of said individual, positive or negative, can be reached and process 200 ends at 211.

In a controlled environment facility, such as a prison or jail, controlling access, information, interaction, and/or transactions is often of particular interest. In a prison facility in particular, safety and security is of paramount importance and, therefore, the number one job of the personnel thereof is to effectively implement controls with respect to the residents (inmates) thereof. However, such controlled environments often provide an environment much like a small city in which a number of individuals work and live, thus requiring various goods and/or services associated with civilized society. Accordingly, various exchanges of information, money, goods, etcetera may be performed in association with individuals of a controlled environment, both within the controlled environment and external thereto. For example, an inmate residing in a prison facility may be allowed to place phone calls to friends and family outside of the prison facility. Likewise, an inmate may be allowed to purchase commissary items, such as through use of a prepaid account funded by friends and family, such as when visiting the prison facility or by mailing checks or money orders on behalf of an inmate. An inmate may also be provided medical services, such as dispensing of prescription medications. Proper authentication of a resident, detainee or inmate's identity is desirable in these instances. Similar controlled environment facilities might include nursing homes hotels, military bases, secure business facilities, secure government facilities, secure research facilities, and the like.

Specific examples of biometrics and other identifying data cross-hatching that might be used in an incarceration, law enforcement, or other environment may include the permutations shown in table 300 of FIG. 3. In an incarceration environment inmate authentication in accordance with the present systems and methods may be employed during many functions taking place during an inmate's stay. Authentication can begin with booking and may be used for various functions or events that takes place during the stay, such as transport events, delivery of medical services or medications, exercise, disciplinary action, visitation, and/or the like. through release. Additionally, the present systems and methods may be used to authenticate correctional officer in the course of going about their duties in a correctional facility, or in a similar manner in a jail for authenticating law enforcement officers or other authorized personnel. Such authentication of officers and other authorized personnel may employ some or all of the same equipment used to authorize detainees for various activities, events and movements.

As an example of detainee authentication, booking 301, such as the intake of a detainee into a detention facility, may at 302 employ a voice print and PIN in Conjunction with a challenge phrase for authentication in accordance with the present invention. Alternatively, booking 301 may at 303 employ a voice print and a fingerprint in conjunction with a PIN and challenge phrase. As a further alternative, a voice print, a feature scan, an iris scan, a PIN and a challenge phrase may be cross-hatched at 304 during booking 301. Yet another alternative embodiment would call for cross-hatching a voice print, an iris scan a PIN and a challenge phrase at 305 during booking 301 while another embodiment might employ cross-hatching of a voice print, a feature scan, a PIN and a challenge phrase at 306. As noted above, a feature scan my include a scan of facial features, scars, tattoos, birthmarks and/or the like.

As an example of use of the present invention within a jail or detention facility to facilitate different activities which inmates or detainees take part, detainees may make use of various forms of communication 307, such as a phone to make an allowed phone call, a computer or terminal to send an allowed email, or the like. Such use may be subject to a verification process, such as verification of the identity of the person making a call or the person receiving a phone call. The identification portion of the verification process may include at 308 both employing a non biometric challenge phrase while using the answer to the challenge phrase to elicit a voice print sample. The voice print and challenge phrase may be used in conjunction with a PIN assigned to that detainee. Alternatively, as shown at 309 a fingerprint mechanism associated with the phone being used may be employed by the present systems and methods in conjunction with a voice print, PIN and challenge phrase in an attempt to verify the identity of the caller and or called party.

For transactions 310, such as commissary ordering or the like, a voice print, PIN and challenge phrase may be cross-hatched for authentication at 311. Alternatively at 312, a voice print, fingerprint, PIN and challenge phrase may be used to authenticate an individual carrying out a transaction.

Another example of use of the present invention in a detention environment may involve controlling access to specific areas at particular times, maybe by particular individuals. Oftentimes detainees are issued barcode bracelets and/or PINs. When a detainee attempts to move from one area to another such as from a cell block to a recreation area they may be required to provide their identification in the form of the barcode on a bracelet or their PIN. The present systems and methods may confirm the person's identity using biometrics. For example, a fingerprint device located at an exit from the cell area and/or entrance to the recreation area can be used to scan a detainee's fingerprint. At 315 table 300 illustrates example combinations 316, 317 and 318 of biometrics and non biometrics which may be cross-hatched to carry out authentication for events such as recreational, medical call, exercise, or the like. At 316 a voice print, PIN and challenge phrase are cross-hatched for authentication, while at 317 a voice print, hand analysis, PIN, and challenge phrase are cross-hatched. Alternatively, at 318 a voice print, iris scan, PIN and challenge phrase may be iteratively cross-hatched in accordance with the present invention for event authentication.

For visitation 320 such as a family member or other person visiting a detainee in a detention facility, a facility may not have extensive biometric enrollment records for the visitor. Thus, this situation is somewhat different from those discussed above in that "account" information is not available for the visitor. Therefore, in accordance with the present invention biometric information may be gathered from an individual upon their first visit and retained for subsequent identification or verification. Such information to be gathered and used in subsequent cross-hatchings might include a voice print which can be obtained while setting a challenge phrase, which can be used together for authentication cross-hatching 321. Alternative cross-hatching 322 might employ voice print, fingerprint and challenge phrase while authentication embodiment 323 might use voice print, hand analysis and challenge phrase, and further alternative embodiment cross-hatching 324 might make use of voice print, fingerprint, iris scan and a challenge phrase. A further biometric well suited for visitation 320 to be used in crosshatching, such as in conjunction with authentications 321, 322 323 or 324, might be a feature or facial scan, particularly given the prevalence of security cameras present in visitation areas of most detention facilities. A PIN might not be employed with visitors as it may be impractical to assign a PIN since the visitor may not return. Also, it might be impractical for the visitor to keep track of an assigned PIN for subsequent visits which might be sporadic or widely spaced.

For release 325 of a detainee it is imperative that the subject be properly authenticated whether the release be permanent or temporary, such as for one of the purposes discussed below in relation to tracking and identifying 335. Thus, release 325 of a detainee may employ a voice print and PIN in conjunction with a challenge phrase for authentication in accordance with the present invention at 326. Alternatively, release may at 327 employ a voice print and a fingerprint in conjunction with a PIN and challenge phrase. As a further alternative, a voice print, a feature scan, an iris scan, a PIN and a challenge phrase may be cross-hatched at 328 for release at 325. Another alternative embodiment for release at 325 calls for cross-hatching a voice print, an iris scan, a PIN and a challenge phrase at 329, while another embodiment might employ cross-hatching of a voice print, a feature scan, a PIN and a challenge phrase at 330. Further, given the import of full authentication for release 325, a higher threshold for authentication may be employed, and thus further iteration of successive biometrics and non-biometric identification may be employed in accordance with embodiments of the present invention. Again as noted above, a feature scan my include a scan of facial features, scars, tattoos, birthmarks and/or the like.

Outside a detention facility information sharing authentication 331, such as may be carried out by a detention facility with family or friends of a detainee, may make use of cross-hatching of a voice print, PIN and challenge phrase at 332. Alternatively, a voice print, fingerprint, PIN and challenge phrase may be cross-hatched at 333 for information sharing authentication 331.

The present systems and methods may be used to effectively track and identifying (335) detainees who are required on occasion to leave a detention facility for various reasons or in various programs such as home incarceration, rehabilitation, work-release, to attend school, medical reasons or to attend a funeral. Such individuals may be effectively tracked and identified, using biometric components cross-hatched with other identifying data. By way of example cross-hatching verifications 336, 337 and 338 are particularly well suited for use in authenticating a subject calling in on a telephone. Cross-hatching authentication 336 employs a voice print, PIN and challenge phrase, while authentication 337 employs voice print, fingerprint, PIN and challenge phrase. As a further example, detainees at work or other authorized location can call into the responsible detention facility and be identified using a voice print and fingerprint along cross-hatched with the Automatic Number Identification (ANI) of the phone the detainee is calling from, or as shown at 338 a voice print, the ANI and challenge phrase. Another alternative cross-hatching authentication embodiment (339) that might be used in properly equipped facilities or locations for tracking and identifying detainees might include a fingerprint, a feature scan and challenge phrase.

In a law enforcement environment an officer could iteratively use a fingerprint and/or voice print or the like to confirm the stated or otherwise provided identity of a suspect. A voice print might be provided to a central database via a communication device such as a cell phone whereas a fingerprint could be acquired using a fingerprint scanner or the like. This identification can be used in conjunction with a law enforcement network or the like to insure that an individual, such as a parolee or some one under "house arrest" is in an approved location.

Tracking, identification and verification of individuals on parole (ex-inmates) 340 with respect to their location and time is often critical to investigators. The present systems and methods may be utilized to effectively place and identify these individuals using a cross-hatching of biometric components, such as voice print, fingerprint and challenge phrase (341) or an iris scan, hand analysis and challenge phrase (342). However, a very effective authentication cross-hatching (343) might include a voice print, an ANI obtained when such a parolee calls in to a parole officer or the like, fingerprint obtained from a scanner associated with the phone from which a parolee calls, the time of the call, and a challenge phrase elicited from the parolee, which will also yield the aforementioned voice print.

Police Officers or other law enforcement officers frequently apprehend or detain individuals suspected of being involved with criminal activity. Embodiments of the present systems and methods may be employed to effectively provide a reverse lookup capability 345 for an officer's use in verifying the identity of a suspect. Biometric components such as voice print and fingerprint can be cross-hatched (at 346) with a challenge phrase or other non-biometric to successfully verify the identity by matching against a database of information previously recorded on the suspect. Specifically, a suspect may be required to speak a set number of unique words (to provide voice print data), answer a challenge question (provide a challenge phrase), and provide a fingerprint (using a fingerprint scanner in the officer's cruiser) to be cross-hatched with a database in accordance with the present systems and methods.

At public buildings or facilities, such as airports, court houses, or the like (350), cross-hatching 351 of a fingerprint, an iris scan and a challenge phrase; cross-hatching 352 of an iris scan, a retinal scan and a challenge phrase; or cross-hatching 353 of a hand analysis, iris scan and challenge phrase; may be used to authenticate individuals, particularly those seeking access to restricted areas.

Preferably, booking 301, phone call 305, commissary ordering 310, events 315, release 325, visitation 350 and public building related authentications 350 may, in accordance with the present systems and methods, make use of wireless local area network connectivity (WiFi) technology. The addition of WiFi devices in a detention facility or in public areas, such as airports may be used to greatly enhance capabilities provided by the present systems and methods to assist investigators and law enforcement personnel in identifying, verifying, authenticating and apprehending suspects. WiFi connectivity typically takes place through access points, or "hot spots," that use unregulated frequency spectrum. Using wireless devices, WiFi access can be set up any number of places in a detention or public facility. Additional wiring is not typically, providing a convenient way to identify and authenticate individuals anywhere in the facility. Biometric components such as fingerprints or voice prints can be obtained via wireless devices and the resulting biometric templates can be cross-hatched with other data such as challenge phrases and identification numbers.

FIG. 4 is a diagrammatic illustration of an example of authentication 400 used for placement of a phone call by a detainee in accordance with an embodiment of the present invention. A detainee picks LIP phone 401 and enters PIN or other identification number. Preferably, a call application manger 402 elicits a voice sample by having the detainee speak a challenge phrase. A fingerprint scanner associated with phone 401 may be used to obtain a fingerprint for further iterative cross-hatching as necessary. As noted above, voice print and fingerprint are a combination of biometrics which can be obtained in accordance with the present invention through telephones equipped with an associated fingerprint scanner. The present system 403 cross-hatches the detainee's voice print and identification data with data obtained form biometrics database 404 and identification database 405, as detailed above, to verify the individual. Call applications manager 402 may also determine if the individual is otherwise allowed to place the call, if so the call proceeds and the detainee is connected to called party 406. As a further alternative, the present systems and methods may be used to authenticate the identity of the called party for purposes of billing, to confirm compliance with restrictions placed on the calling detainee, for investigative purposes, or for similar reasons.

Advantageously the use of biometrics in accordance with the present invention may help companies or institutions that employ verification on a regular basis, such as banks or government agencies to avoid significant costs associated with resetting passwords and PINs. Many institutions employ outside enterprises to provide insulation and security for PINs and passwords. These third party services can be quite expensive, particularly when resetting of a PIN or password is required. This expense is rarely passed along directly to users or customers. Use of biometrics insures that a customer will not lose or forget the means to access their account, otherwise take advantage of services or be granted access to a location. As an example, if the institution employs the present systems and methods, if a customer is enrolled and forgets their PIN, there may be no need to reset the customer's PIN, as iterative analysis of biometrics can be used to verify that the subject should be granted access to the account service or location.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An authentication method comprising iterative and successive cross-hatching of at least one of a plurality of biometric components with at least one of a plurality of other identifying data, wherein a subject of said authentication is a resident of a controlled environment facility.

2. The method of claim 1 wherein said authentication is identification of an individual.

3. The method of claim 1 wherein said authentication is verification of an individual's identity.

4. The method of claim 1 wherein said at least one biometric component comprises a voice print.

5. The method of claim 1 wherein said at least one biometric component comprises a fingerprint.

6. The method of claim 1 wherein said at least one biometric component comprises a hand analysis.

7. The method of claim 1 wherein said at least one biometric component comprises a retina scan.

8. The method of claim 1 wherein said at least one biometric component comprises an iris scan.

9. The method of claim 1 wherein said at least one biometric component comprises a feature scan.

10. The method of claim 9 wherein the features scanned comprise facial characteristics.

11. The method of claim 9 wherein the features scanned comprise at least one tattoo.

12. The method of claim 9 wherein the features scanned comprise at least one birthmark.

13. The method of claim 1 wherein said other identifying data comprises a personal identification number.

14. The method of claim 1 wherein said other identifying data comprises a password.

15. The method of claim 1 wherein said other identifying data comprises a challenge phrase.

16. The method of claim 1 wherein said other identifying data is incorporated into a swipe card.

17. The method of claim 1 wherein said other identifying data is incorporated into a smart card.

18. The method of claim 1 wherein said controlled environment facility is a prison and said resident is an inmate.

19. An authentication method comprising iterative and successive cross-hatching of at least one of a plurality of biometric components with at least one of a plurality of other identifying data, wherein said at least one biometric component comprises a feature scan, and wherein the features scanned comprise one or more of at least one scar, at least one tattoo, and at least one birthmark.

20. An authentication method comprising iterative and successive cross-hatching of at least one of a plurality of biometric components with at least one of a plurality of other identifying data, wherein said other identifying data is incorporated into a radio frequency card.

21. An authentication method comprising iterative and successive cross-hatching of at least one of a plurality of biometric components with at least one of a plurality of other identifying data, wherein said other identifying data comprises a barcode.

22. The method of claim 21 wherein said barcode is disposed on a bracelet.

23. A security method comprising:
accepting a submission of a plurality of different types of biometric samples from a subject;
storing data based on said biometric samples in a database as related to said subject and related to identifying data associated with said subject;
receiving identifying data from an individual who is to be authenticated;
gathering biometric data from said individual who is to be authenticated;
cross-hatching the received identifying data and the gathered biometric data against said data stored in said database to authenticate said individual; and
successively gathering additional biometric data from said individual in response to said cross-hatching failing to authenticate said individual, and iteratively repeating said cross-hatching, incorporating the successive biometric data until a determinative authentication status of said individual can be reached.

24. The method of claim 23 wherein said authentication is identification of said individual.

25. The method of claim 23 wherein said authentication is verification of said individual's identity.

26. The method of claim 23 wherein type of identifying data received and the type of biometric data gathered varies based on location in a facility.

27. The method of claim 23 wherein type of identifying data received and the type of biometric data gathered varies based on a unction said individual wishes to carry out.

28. The method of claim 23 wherein said subject is a resident of a controlled environment facility.

29. The method of claim 28 wherein said controlled environment facility is a prison and said resident is an inmate.

30. The method of claim 23 wherein said types of biometric samples and data comprise at least one of a voice print, a fingerprint, a hand analysis, a retina scan, an iris scan and a feature scan.

31. The method of claim 30 wherein the features scanned in a feature scan comprise at least one of facial characteristics, at least one scar, at least one tattoo, and at least one birthmark.

32. The method of claim 23 wherein said identifying data comprises at least one of an account number, a personal identification number, a password, a challenge phrase, a barcode, and data incorporated into a card.

33. A security method comprising:
accepting a submission of at least one type of biometric sample from a subject;
storing data based on said biometric sample in a database as related to said subject and related to identifying data associated with said subject;
receiving identifying data from an individual who is to be authenticated;
gathering biometric data of said at least one type from said individual who is to be authenticated;
cross-hatching the received identifying, data and the gathered biometric data against said data stored in said database to authenticate said individual; and
successively requesting additional identifying data from said individual in response to said cross-hatching failing to authenticate said individual, and iteratively repeating said cross-hatching, incorporating the successive identifying data until a determinative authentication status of said individual can be reached.

34. The method of claim 33 wherein said authentication is identification of said individual.

35. The method of claim 33 wherein said authentication is verification of said individual's identity.

36. The method of claim 33 wherein type of identifying data received and requested and the type of biometric data gathered varies based on location in a facility.

37. The method of claim 33 wherein type of identifying data received and requested and the type of biometric data gathered varies based on a function said individual wishes to carry out.

38. The method of claim 33 wherein said subject is a resident of a controlled environment facility.

39. The method of claim 38 wherein said controlled environment facility is a prison and said resident is an inmate.

40. The method of claim 33 wherein said types of biometric samples and data comprise at least one of a voice print, a fingerprint, a hand analysis, a retina scan, an iris scan and a feature scan.

41. The method of claim 40 wherein the features scanned in a feature scan comprise at least one of facial characteristics, at least one scar, at least one tattoo, and at least one birthmark.

42. The method of claim 33 wherein said identifying data comprises at least one of an account number, a personal identification number, a password, a challenge phrase, a barcode, and data incorporated into a card.

43. An authentication system comprising:
   means for accepting submission of biometric samples of a plurality of different types from a subject;
   a database storing data based on said biometric samples as related to said subject and related to identifying data associated with said subject;
   means for receiving identifying data provided by an individual who is to be authenticated;
   means for gathering biometric data of at least one of said types from said individual who is to be authenticated; and
   an algorithm cross-hatching the received identifying data and the gathered biometric data against said data stored in said database to authenticate said individual, in response to said cross-hatching failing, said algorithm directing said means for receiving identifying data to query said individual for successive identifying data, and said algorithm iteratively repeating said cross-hatching, incorporating said successive identifying data, until a determinative authentication status of said individual can be reached.

44. The system of claim 43 wherein said authentication is identification of said individual.

45. The system of claim 43 wherein said authentication is verification of said individual's identity.

46. The system of claim 43 wherein type of identifying data received and queried and the type of biometric data gathered varies based on a location in a facility where said authentication is taking place.

47. The system of claim 43 wherein type of identifying data received and queried and the type of biometric data gathered varies based on a function said individual wishes to carry out.

48. The system of claim 43 wherein said subject is a resident of a controlled environment facility.

49. The system of claim 48 wherein said controlled environment facility is a prison and said resident is an inmate.

50. The system of claim 43 wherein said types of biometric samples and data comprise at least one of a voice print, a fingerprint, a hand analysis, a retina scan, an iris scan and a feature scan.

51. The system of claim 50 wherein the features scanned in a feature scan comprise at least one of facial characteristics, at least one scar, at least one tattoo, and at least one birthmark.

52. The system of claim 43 wherein said identifying data comprises at least one of an account number, a personal identification number, a password, a challenge phrase, a barcode, and data incorporated into a card.

53. An authentication system comprising:
   means for accepting submission of biometric samples of a plurality of different types from a subject;
   a database storing data based on said biometric samples as related to said subject and related to identifying data associated with said subject;
   means for receiving identifying data provided by an individual who is to be authenticated;
   means for gathering biometric data of at least one of said types from said individual who is to be authenticated; and
   an algorithm cross-hatching the received identifying data and the gathered biometric data against said data stored in said database to authenticate said individual, in response to said cross-hatching failing, said algorithm directing said means for gathering biometric data to gather successive biometric data from said individual, and said algorithm iteratively repeating said cross-hatching incorporating said successive biometric data, until a determinative authentication status of said individual can be reached.

54. The system of claim 53 wherein said authentication is identification of said individual.

55. The system of claim 53 wherein said authentication is verification of said individual's identity.

56. The system of claim 53 wherein type of identifying data received and the type of biometric data gathered varies based on a location in a facility where said authentication is taking place.

57. The system of claim 53 wherein type of identifying data received and the type of biometric data gathered varies based on a function said individual wishes to carry out.

58. The system of claim 53 wherein said subject is a resident of a controlled environment facility.

59. The system of claim 58 wherein said controlled environment facility is a prison and said resident is an inmate.

60. The system of claim 53 wherein said types of biometric samples and data comprise at least one of a voice print, a fingerprint, a hand analysis, a retina scan, an iris scan and a feature scan.

61. The system of claim 60 wherein the features scanned in a feature scan comprise at least one of facial characteristics, at least one scar, at least one tattoo, and at least one birthmark.

62. The system of claim 53 wherein said identifying data comprises at least one of an account number, a personal identification number, a password, a challenge phrase, a barcode, and data incorporated into a card.

* * * * *